Aug. 11, 1959 A. S. JENKINS 2,899,349
METHOD FOR BONDING LINER MATERIALS
Original Filed Jan. 26, 1953 4 Sheets-Sheet 1
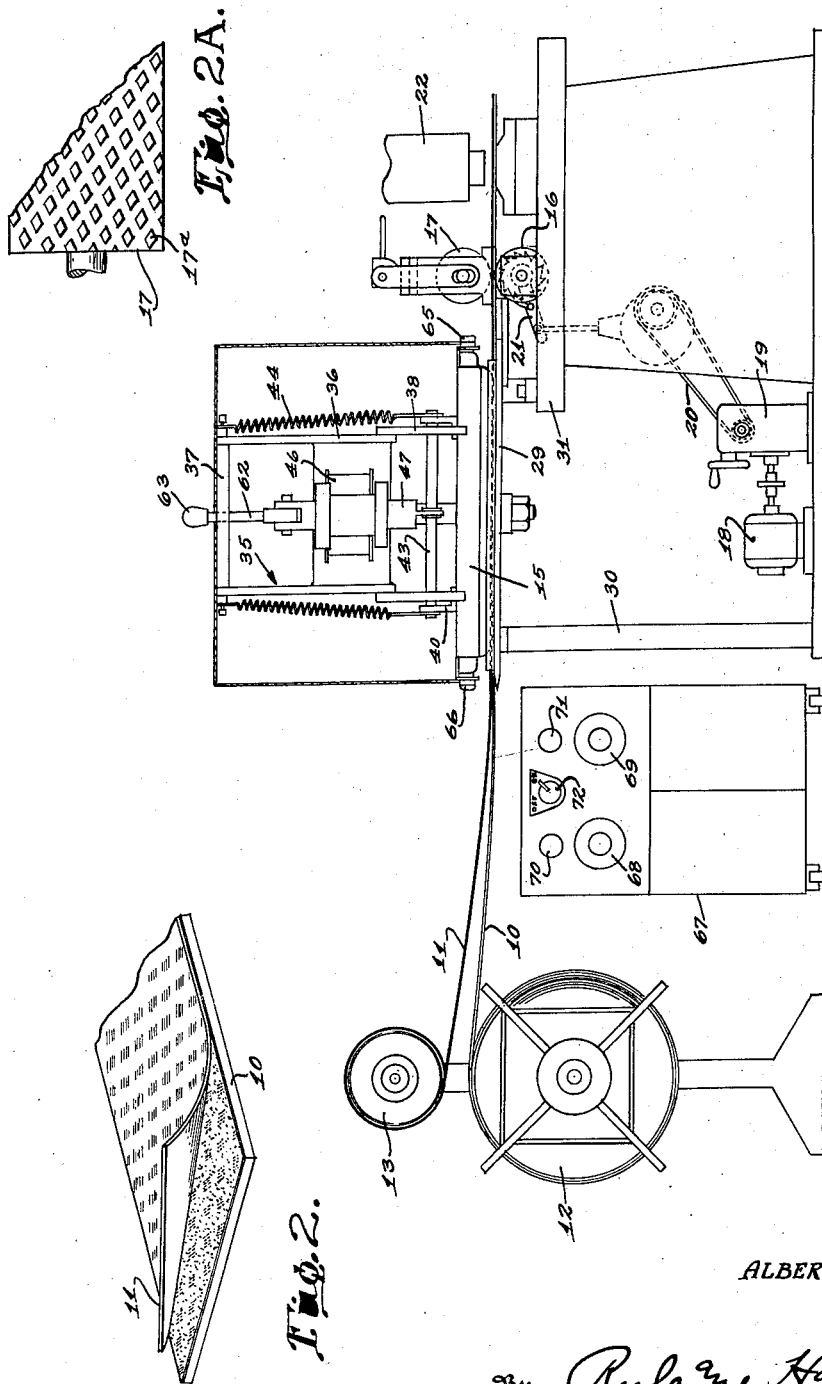
Inventor
ALBERT S. JENKINS
By Rule and Hoge.
Attorneys Inventor
ALBERT S. JENKINS
By Rule and Hoge
Attorneys

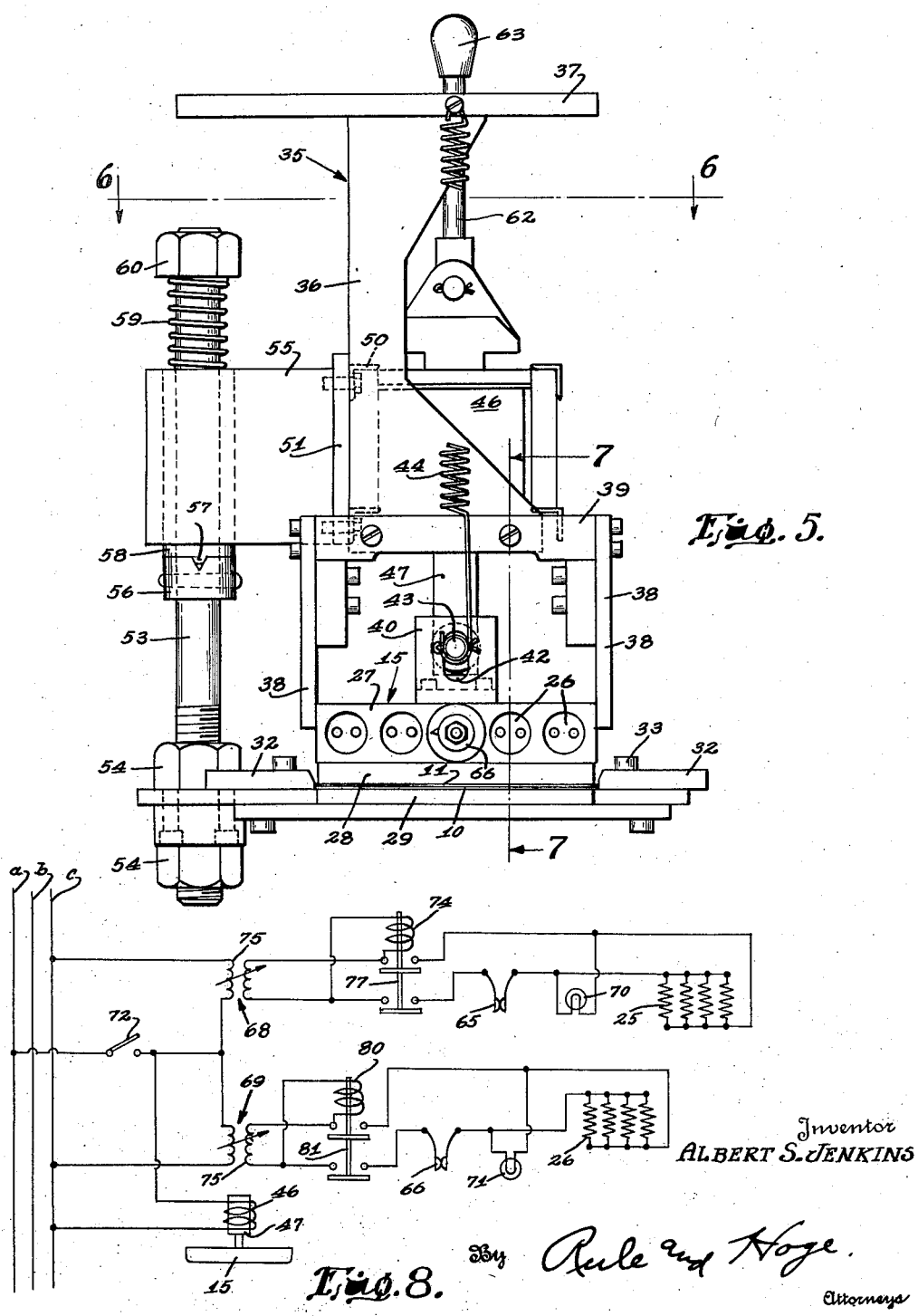

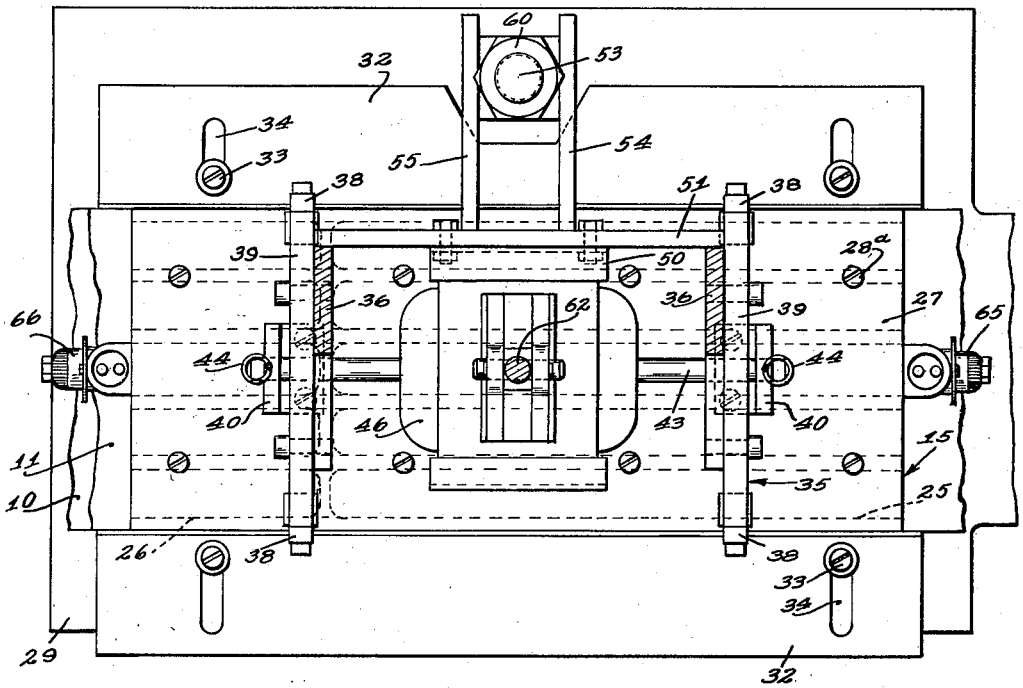

United States Patent Office 2,899,349
Patented Aug. 11, 1959

2,899,349

METHOD FOR BONDING LINER MATERIALS

Albert S. Jenkins, Toledo, Ohio, assignor to Owens-Illinois Glass Company, a corporation of Ohio Original application January 26, 1953, Serial No. 333,088. Divided and this application February 8, 1956, Serial No. 564,163

6 Claims. (Cl. 154—138)

My invention relates to a method of producing disk liners such as used in caps or closures for bottles, jars or the like. It relates particularly to the production of disk liners of the type in which wax-coated disks of sheet material have bonded thereto an impervious membrane forming a facing for the disk.

The invention embodies modifications and improvements in the method disclosed in the patent to Elser et al. 2,584,002, January 29, 1952, Method and Apparatus for Bonding Closure Materials, in which an impervious membrane facing is bonded to a wax-coated liner material at a multiplicity of points.

In practicing the method the two webs which are to be bonded together are first brought into superimposed relation and then subjected to a heat treatment by which the webs are both heated within a heating zone while the webs are positioned with one overlying the other. The webs are both brought to substantially the same temperature at which the bonding material is softened. The webs are then bonded together by pressure.

An object of the invention is to provide a reliable method of effectively bonding the webs together, overcoming difficulties encountered in prior art methods, particularly the method disclosed in the above identified patent to Jenkins wherein only one of the webs is heated before they are brought into superimposed relation.

Other objects of the invention will appear more fully hereinafter.

The present application is a division of my copending application, Serial Number 333,088, filed January 26, 1953, Apparatus for Bonding Liner Materials, now abandoned.

In a preferred form of apparatus for practicing my invention, a web of the wax-coated liner material and a web of the impervious facing membrane or material are fed horizontally through a heating zone, with the webs in superposed relation, the impervious membrane overlying the wax-coated web. Within the heating zone the webs pass beneath a hot plate comprising batteries of electrical heating elements or cartridges embedded in a housing material and having a shoe or flat contact plate attached to the underside of the housing and bearing on the webs traveling therebeneath. The electric current is supplied to the heating elements through Powerstats or voltage regulators by which the voltage can be adjusted for maintaining any desired temperature. Temperature control devices comprising thermostats automatically control the current supply to the heating elements and maintain them at a substantially constant temperature and are adjustable to regulate the temperature and thereby regulate and control the degree of the bond between the impervious facing membrane and the wax-coated liner material. The webs are guided through the heating zone between guide plates adjustable to accommodate webs of varying widths. The webs are fed forwardly step-by-step by intermittent driving means in cooperation with a stamping die by which the disk liners are stamped from the bonded webs.

The invention provides improved means by which the temperature during the bonding process may be accurately controlled and maintained within close tolerances and readily adjusted. This makes it practical to use an intermittent drive for feeding the webs forwardly step-by-step in cooperation with the stamping die. A battery of heating elements at the intake end of the heating zone permits an initial heating of the webs to a uniform desired temperature. The webs then pass beneath the main battery of heating elements by which the temperature may be maintained or increased. This combination provides for a complete, accurate and uniform bonding operation which is not found possible or practical with a single battery of heaters, and permits a material reduction in the overall length of the heating elements and the amount of electrical energy consumed.

Referring to the accompanying drawings:

Fig. 1 is an elevational view, partly diagrammatic, of a preferred form of apparatus for use in practicing my invention;

Fig. 2 is a fragmentary perspective view of a section of the bonded webs with a portion of the impervious membrane separated to indicate the pattern of the bonded material;

Fig. 2A is a fragmentary view of the patterned impression roll by which the webs are bonded at isolated points;

Fig. 5 is an end elevation of the parts shown in Fig. 3;

Fig. 6 is a part sectional plan view, the section being taken at the line 6—6 on Fig. 5;

Fig. 7 is a section at the line 7—7 on Fig. 5; and

Fig. 8 is a wiring diagram of the electrical apparatus.

Figure 3:
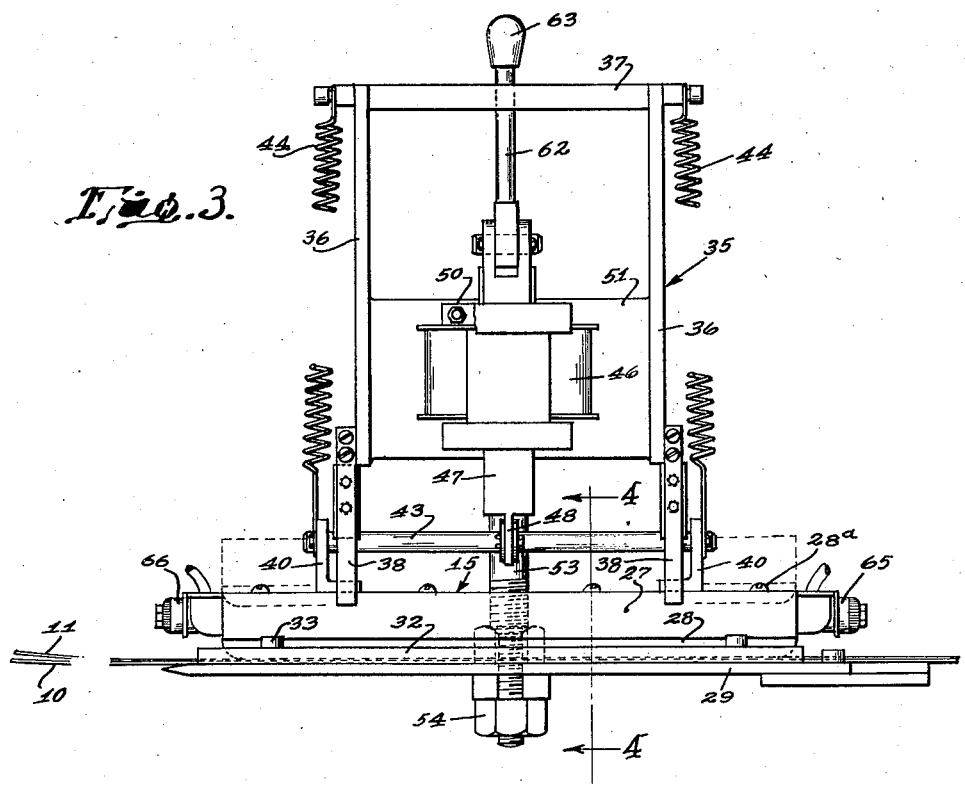
Fig. 3 is an elevational view of the hot plate assembly and its carrier frame.

Referring to Fig. 1, a web 10 of wax-coated sheet liner material and a web 11 of impervious facing material are fed forward from the rolls 12 and 13 respectively. The webs are drawn horizontally through the heating zone in which they pass beneath a hot plate 15 by which the webs are heated preparatory to being bonded together as hereinafter described. The webs are fed forward intermittently, step-by-step, by a pair of feed rolls 16 and 17. The roll 16 is geared to an electric motor 18 through speed reduction gearing within a gear box 19, a driving belt 20, and a pawl and ratchet device 21. Stamping die 22 is operated in timed relation to the intermittent movement of the bonded webs for stamping the disk liners from the webs.

The hot plate 15 comprises a main battery of electrical heating elements or cartridges 25 and also a battery of cartridges or initial heating elements 26 for initially heating the webs. These cartridges are embedded in a housing 27 of heat-conducting material in the form of a flat horizontal plate to the under surface of which is removably attached a shoe 28 by screws 28ª. The shoe 28 is in the form of a flat plate which rests on the webs 10, 11 as the latter traverse the heating zone. The webs are supported during their passage through the heating zone on a bottom plate 29. The plate 29 is mounted on a framework comprising a standard 30 (Fig. 1) and a platform 31, the latter also providing a mounting for the feed rolls and the stamping die.

Guide bars 32 mounted on the plate 29 extend lengthwise thereof for guiding the webs through the heating zone. The guide bars are adjustable laterally for webs of different widths and held in adjusted position by screws 33 extending through slots 34 in the guide bars.

Figure 4:
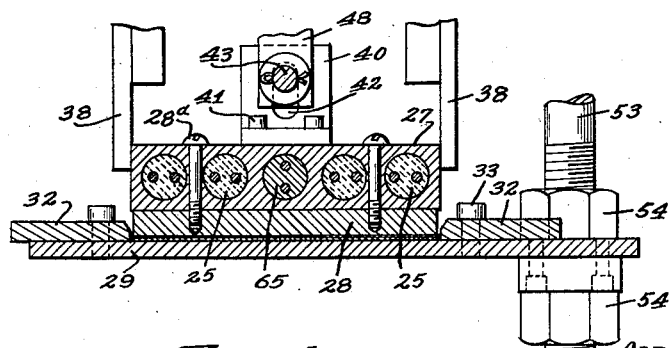
Fig. 4 is a section at the line 4—4 on Fig. 3 showing particularly the heating elements.

The hot plate 15 is mounted for up and down floating movement in the lower end of a carrier frame 35. This frame includes vertical side frame members 36 connected at their upper ends by a top frame member 37. Vertical guide bars 38 are bolted to and extend downwardly from horizontal frame bars 39 (Fig. 5) bolted to the frame members 36. The hot plate is slidable up and down between the guide bars 38. Angle bars 40 attached by bolts 41 to the upper surface of the hot plate, are formed with vertical slots 42 (Fig. 4) through which extends a horizontal rod 43. Vertical coil springs 44 are attached at their lower ends to the rod 43 and at their upper ends to the upper frame member 37. These springs are under tension and are operative to lift the hot plate to the dotted line position (Fig. 3) as presently described.

The rod 43 is lowered against the tension of the springs 44 by means of an electromagnet 46 having a vertically movable armature 47. The armature is connected by a strap 48 to the rod 43. The solenoid 46 may have a fixed mounting within the frame 35. Angle bars 50 on the solenoid frame are bolted to a plate 51 forming part of the carrying frame 35. The frame 35 and parts carried thereby are mounted on a post 53 in the form of a bolt having threaded thereon, nuts 54 by means of which it is clamped to the bottom plate 29. An arm 55 mounted on the post 53, comprises a pair of forwardly extending plates attached or welded to the frame plate 51. The carrying arm 55 is rotatably mounted on the post 53 and also slidable vertically thereon. A collar 56 keyed to the post 53 is formed with a V-notch 57 to receive a lug formed on a collar 58 attached to the arm 55 for holding the carrier frame in operative position. A coil spring 59 mounted on the post 53 is held under compression between the arm 55 and a nut 60 on the post. The frame 35 and parts carried thereby may be lifted relative to the post 53 and pivoted about the post to a position at one side of the bottom plate 29. A rod 62 is attached to the upper end of the electromagnet core 47 and extends upwardly through an opening in the frame plate 37 and is provided with a handle 63 which serves as a convenient means for applying pressure to the hot plate when required, as for example, when starting the webs through the machine or for other purposes.

Temperature control devices 65 and 66 (Fig. 8) control the current supply to the main heating elements 25 and initial heating elements 26 respectively. These temperature control devices comprise thermostats of conventional construction which operate automatically to open and close the circuits for the heating elements in response to temperature variations and are provided with the usual adjusting means for determining the temperature at which they operate. The thermostats are embedded in the housing of the hot plate 27 (see Figs. 3 and 4).

Current is supplied to the heating elements through powerstats 68 and 69 (Figs. 1 and 8) mounted in a cabinet 67. Each powerstat comprises a variable transformer which operates automatically to maintain a constant voltage on the heating elements which are connected in the secondary circuit, and also comprises means for adjusting such secondary voltage throughout a wide range as for example from zero upward to full voltage.

Pilot lamps 70 and 71 mounted within the cabinet 67 are tied in with the thermostats, as hereinafter described, for indicating when the current is turned on and off the heaters. A normally open control switch 72 mounted in the cabinet is operable manually for connecting and disconnecting the heating elements to and from the current supply.

The operation is as follows. Referring to the electrical wiring diagram Fig. 8, the control devices are shown in the inoperative positions assumed when the manual control switch is open and the current supply cut off. Alternating current is supplied through the mains *a, b, c,* in a three phase system. When the manual switch 72 is closed, the primary coils 75 of the transformers 68, 69 are connected in parallel across the mains *a* and *c*. Closing of the switch 72 also completes the circuit for the electromagnet 46 so that its armature 47 is moved downward and lowers the rod 43 against the tension of the springs 44, permitting the hot plate 15 to move downward and rest on the webs 10, 11 which are being drawn forwardly over the bottom plate 29. The weight of the hot plate 15, including the housing 27 and attached shoe 28, is thereby transferred from the rod 43 to the webs 10 and 11 so that the webs and the bonding material are held together under the pressure due to such weight. The bottom plate 29 provides a bottom support to which such pressure is transmitted through the webs so that a counterbalancing upward pressure is applied to the under surface of the superposed webs substantially equal to and coextensive with the downward pressure.

When the transformer 68 is energized by the closing of the switch 72, a coil 74 in circuit with the secondary of the transformer is energized and closes a switch 77 thereby completing a circuit through the battery of heating elements or cartridges 25 and the thermostat 65 connected in series therewith. Current is thus applied for heating the cartridges and the portion of the housing 27 in which they are embedded to a predetermined temperature. The pilot lamp 70 is also lighted, indicating that current is being supplied to the heating coils. The thermostat 65 opens automatically when the predetermined temperature is exceeded and automatically closes as the temperature falls, thereby maintaining a substantially constant temperature. Adjusting means for the thermostat permits the operating temperature to be adjusted to a higher or lower degree as required by operating conditions. The transformer 68 is adjustable to supply any desired voltage.

Current is supplied to the battery of heating elements 26 through a switch 81 actuated by a coil 80 in circuit with the secondary of the transformer 69. The current supply to the heating elements 26 is controlled by the thermostat 66, the pilot lamp 71 indicating the opening and closing of the circuit. The current supply to the heating elements 26 is regulated and controlled in the same manner as above described in connection with the heating elements 25, and serves to heat initially the entering webs.

As the webs 10 and 11 are drawn forwardly step-by-step over the bottom plate 29 the heat supplied by the hot plate 15 heats the web 11 which transmits heat to the wax-coated web 10, thereby increasing the tackiness of the wax coating so that as the webs pass beneath the feed roll 17 which also functions as an impression roll, the webs are bonded together at a multiplicity of points or areas corresponding to the pattern 17ª formed in relief on the impression roll (Fig. 2A). The liner disks are severed by the stamping die 22.

The wax coating (or other bonding material) may be applied with equally satisfactory results to either the web 10 or the web 11 which forms the impervious facing membrane for the wax coated liners. The application of a wax coating to the web 11 is to be considered a full equivalent of such an application to the web 10 as herein set forth.

It will be understood that various steps involved in the method may be performed by hand and other steps of the method by apparatus materially different from that herein illustrated.

I claim:

1. The method of bonding together two webs of sheet material, one of which has a surface coated with a bonding material, which method comprises bringing the webs together with one overlying and in contact with the other with their meeting faces extending in the same plane and with the bonding material between the webs at said plane, drawing the webs forwardly in intermittent stepwise fashion through a heating and pressing zone while maintaining said webs in said plane and in said superimposed relation, simultaneously applying heat and pressure to an extended surface area of one of the exterior surfaces of the superimposed webs within the said heating zone and thereby heating both webs and the interposed bonding material by conduction of the heat through the webs and bonding material while substantial surface areas of the webs and the bonding material are held together under said pressure, regulating and controlling the supply of heat so as to bring the bonding material to a temperature at which it is softened sufficiently to bond the webs together, intermittently advancing successive portions of said webs to a second pressing zone, and while the webs and bonding material are at substantially said temperature applying to the webs localized pressure substantially greater than said first mentioned pressure and with said localized pressure applied at and confined to a multiplicity of predetermined isolated small areas distributed over the area of the webs in a predetermined pattern and thereby bonding the webs together at said isolated areas.

2. The method of bonding together a wax-coated web of liner material and a web of facing material, said method comprising bringing the webs together with one overlying and in contact with the other and with the wax coating interposed between the webs, intermittently advancing the webs, enclosing the webs in a zone elongated in the direction of travel of the webs, applying downward pressure to the portion of the superposed webs within the heating zone, applying a counter-balancing upward pressure to the under surface of the superposed webs equal to and co-extensive with the said downward pressure, the said pressures being distributed throughout the area of the webs within the heating zone and thereby holding the webs together, applying heat to the outer surface of one of the webs within the heating zone and thereby heating both of the webs by conduction and heating and softening the wax, and while the wax is softened applying a pressure materially greater than said downward pressure and localized in small areas distributed over the surface of the web in a predetermined pattern and thereby bonding the webs together at said localized areas.

3. The method as defined in claim 2, the heat being transmitted to the web through a medium of solid conducting material having a contacting surface overlying and bearing against the web within the heating zone, the said contacting surface of the conducting material being substantially co-extensive with the said area of pressure.

4. In a method of bonding together isolated portions of a pair of webs, one of which bears a wax coating, by the passage of the superimposed webs with the wax coating therebetween through the nip of a pair of cooperating impression rolls, the steps of advancing the superimposed webs through a heating and initial bonding zone in advance of said rolls, and simultaneously heating the webs to soften the wax coating and lightly bonding the webs to one another throughout substantially their entire transverse dimensions by the softened coating prior to completing the bonding of the isolated web portions at the impression rolls.

5. The method which comprises superimposing two webs of sheet material, the inner surface of one web being wax coated, advancing the webs lengthwise through a first combined pressing and heating zone while in said superimposed relation, heating said webs while in said first zone sufficiently to soften said wax coating, pressing the heated webs together at said first zone with a moderate pressure while the wax is in a soft tacky condition, to form an assembly of said sheets uniformly and substantially completely adhered to one another by the tacky wax, transferring the assembly to a second pressing zone and while the wax is still soft applying in said second zone added pressure to one of said heated webs in a pattern in which the pressure is distributed over a multiplicity of isolated contact areas and thereby bonding the webs at said areas of contact.

6. The method which comprises drawing a wax-coated web of sheet liner material and a web of facing material while in superimposed contacting relation through a heating zone, with the wax-coated surface of the liner material in contact with the inner surface of the web of facing material, supplying heat to the superimposed webs during their passage through said heating zone, said heat being sufficient to soften the wax, pressing the webs together with sufficient pressure while in the heating zone to cause the wax to lightly adhere the webs together throughout substantially their entire area of contact in said heating zone, and thereafter applying an additional and increased pressure to the webs at a multiplicity of isolated uniformly spaced contact areas distributed over the web surface, said increased pressure being sufficient to bond the webs together at the areas defined by said pattern, the webs during the application of said increased pressure being maintained at a temperature not higher than that at which they were adhered together while in the heating zone.

References Cited in the file of this patent

UNITED STATES PATENTS

| | | |
|---|---|---|
| 1,787,404 | Taylor et al. | Dec. 30, 1930 |
| 1,943,145 | Ruegenberg | Jan. 9, 1934 |
| 2,073,780 | Brooks | Mar. 16, 1937 |
| 2,107,485 | Liebowtiz | Feb. 8, 1938 |
| 2,154,474 | Scott | Apr. 18, 1939 |
| 2,528,152 | Landgrof | Oct. 31, 1950 |
| 2,537,126 | Francis | Jan. 9, 1951 |
| 2,562,641 | Saunders | July 31, 1951 |
| 2,584,002 | Elser et al. | Jan. 29, 1952 |
| 2,646,835 | Gottesman | July 28, 1953 |
| 2,680,471 | Mercer | June 8, 1954 |